Aug. 8, 1939.  G. SLAYTER  2,168,366
POROUS TUBE FOR STORAGE BATTERY ELECTRODES
Original Filed Feb. 18, 1935
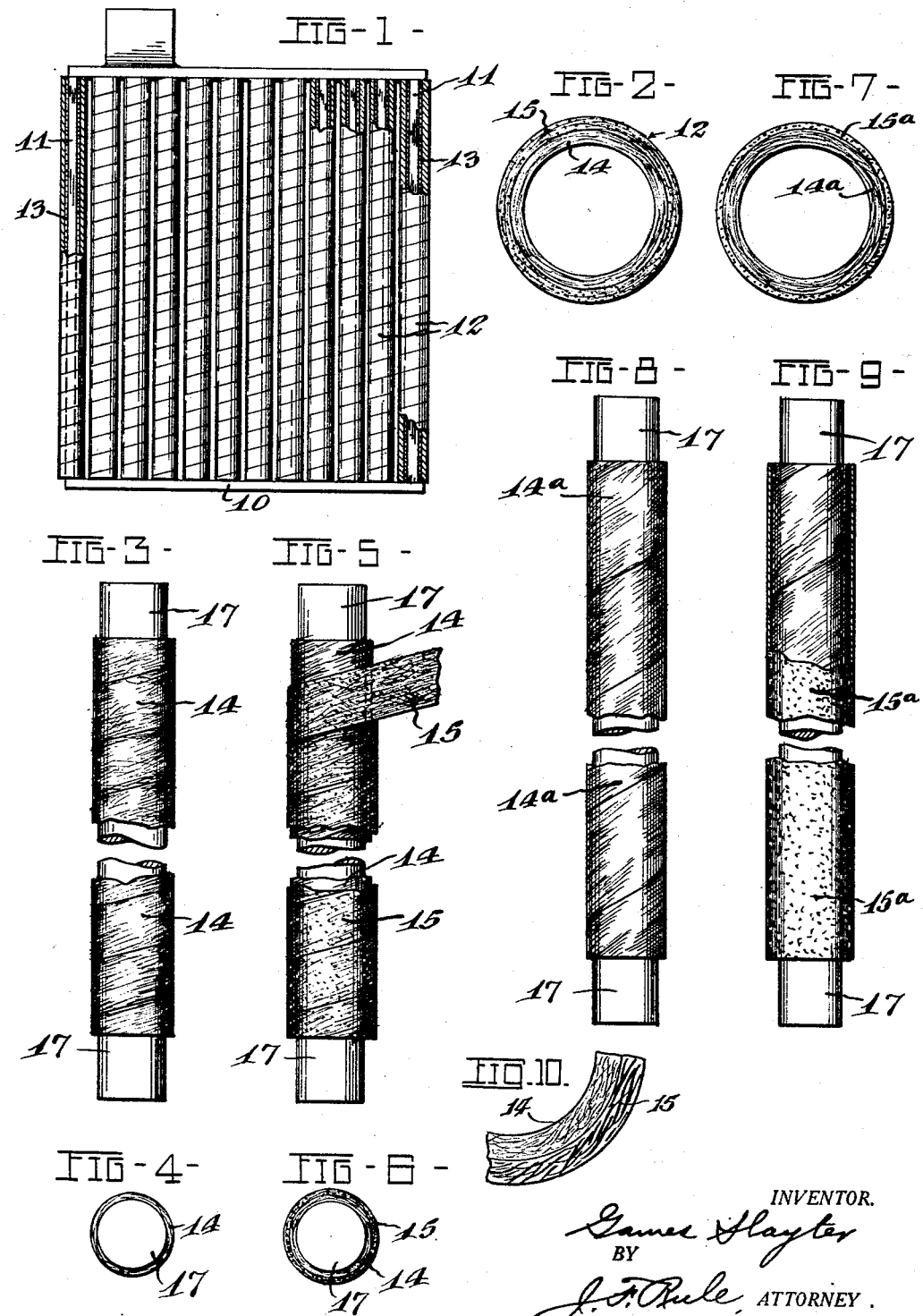
INVENTOR.
Games Slayter
BY
J. F. Rule, ATTORNEY.

Patented Aug. 8, 1939

2,168,366

UNITED STATES PATENT OFFICE 2,168,366

POROUS TUBE FOR STORAGE BATTERY ELECTRODES

Games Slayter, Newark, Ohio, assignor, by mesne assignments, to Owens-Corning Fiberglas Corporation, a corporation of Delaware Application February 18, 1935, Serial No. 6,951
Renewed September 6, 1938

1 Claim. (Cl. 136—147)

My invention relates to porous tubular diaphragms for use in the manufacture of storage batteries, and to the method of making them. A form of positive plate for storage batteries, in common use at the present time, comprises a series of parallel metal rods forming the electrodes and porous tubes or diaphragms surrounding and enclosing the rods, with the lead paste or active material within the tubes and surrounding the electrodes. The function of the tube is to contain the active material and hold it in place, and at the same time allow a free circulation of the battery solution which must have access to such material. For satisfactory results, it is necessary that the tube shall have a definite porosity coupled with a filtering action and that the tube shall withstand the attack of the battery solution. An object of my invention is to provide a tube which will satisfactorily meet these requirements. A further object of the invention is to provide a novel method of making such tube.

Heretofore, tubes or tubular diaphragms for battery electrodes ordinarily have been made with a fibrous organic material to give the necessary porosity, in combination with vulcanized rubber or like material or composition to give the necessary strength and rigidity to the tube. Such tubes are not entirely satisfactory. The active material of the battery coming in direct contact with the rubber composition or the like has a destructive action thereon so that the tubes are corroded and destroyed in a comparatively short time. It has also been found difficult to provide the porosity necessary for a satisfactory circulation of the battery fluid and at the same time retain the active material in position within the tubes.

The present invention aims to overcome these difficulties. I have found that glass in the form of fine fibers matted or felted and known in the trade as glass wool, is particularly adapted for use in making the tubular diaphragms. The tube of fine glass wool may be impregnated with vulcanized rubber or the like, or may comprise an outer layer or coating of the glass wool impregnated with a rubber composition or the like to give the requisite strength and rigidity to the tube.

The present application discloses certain subject-matter also disclosed in my copending application Serial No. 697,617, filed November 11, 1933, entitled "Battery separator plates," and is a continuation of said copending application as to all subject-matter disclosed in both said applications.

Referring to the accompanying drawing:

Fig. 1 is a part sectional elevation of a battery plate comprising tubular diaphragms made in accordance with my invention.

Fig. 2 is an end view on a larger scale of one of the diaphragms.

Fig. 3 illustrates a step in the process of making a tube. It shows a strip of the fibrous material wound on a mandrel.

Fig. 4 is an end view of the same.

Fig. 5 shows a further step including the wrapping of an outer strip or layer of fibrous material impregnated with a binder.

Fig. 6 is an end view of the same.

Fig. 7 is an end view of a modified form of tubular diaphragm.

Figs. 8 and 9 illustrate steps in the formation of the tube shown in Fig. 7.

Fig. 10 is a fragmentary sectional view on an enlarged scale showing the inner and outer layers as being composed respectively of fine and relatively coarse fibers.

Referring to the drawing, the battery plate 10 (Fig. 1) comprises a frame which supports a series of parallel electrodes 11, each of which is enclosed in a tube 12. The lead paste or active material 13 fills the space within the tubes surrounding the electrodes and is held in place by the tubes. As shown in Fig. 2, the tube comprises an inner layer 14 consisting of fine fibers of glass or like material and an outer layer 15 also comprising fibrous glass, but preferably of coarser fibers, this outer layer being impregnated with a binder such as vulcanized rubber or vulcanite to give the required strength and rigidity to the tube.

In the process of making the tube shown in Fig. 2, a strip or web 14 of glass fibers is wound spirally on a mandrel 17 which may be a steel rod. The web 14 which may be made in any approved manner preferably consists of fine glass fibers in matted form. The general direction of the fibers as shown, is lengthwise of the web. The individual fibers may, if desired, be of great fineness. Thus, fibers ranging from five to ten microns in diameter have been found to be well suited for this purpose. Somewhat coarser fibers have also been found to give very satisfactory results.

After the strip 14 has been wound on the mandrel to form an inner layer, a second strip 15 may be wrapped in like manner over the layer 14. The strip 15 also comprises felted or matted glass wool, but is impregnated with a substance such as vulcanite or rubber composition which serves as a binder and stiffening material. The use of relatively coarser fibers in the outer layer 15 when impregnated with vulcanite or the like gives additional strength and rigidity to the tube without destroying the porosity thereof. After the strip 15 is wound on the mandrel, the composite tube is vulcanized before being removed from the mandrel, thereby giving the requisite strength and rigidity to the tube. The vulcanized tube may then be removed from the mandrel. The strip 15 may either be impregnated with the rubber composition or the like before being applied to the mandrel, or, if preferred, it may be dipped, sprayed or painted with the impregnating material while on the mandrel.

Fig. 7 illustrates a modified form of tube or diaphragm which comprises a single layer 14ª of matted glass wool or like fibrous material. This layer is wound on the mandrel 17, as shown in Fig. 8, in the same manner as the strip 14. After being thus applied to the mandrel, an outside coating 15ª of vulcanite or the like is applied to the tube. This may be done by dipping, spraying or painting, after which it is vulcanized while still on the mandrel.

The material 15ª which impregnates the glass mat to a greater or less depth, partially fills the voids, giving strength and rigidity to the tube, while retaining the requisite porosity.

It will be observed that the rubber composition is held out of direct contact with the active material 13 of the battery, thereby avoiding the destructive action of such material, which has been found a serious objection in diaphragms such as are in common use at the present day. If the fibrous glass tube is impregnated throughout with the vulcanite, the corroding action would only take place while there is direct contact with the active material. This is in no wise objectionable, as the destructive action ceases as soon as the vulcanite in immediate contact with the active material is eaten away. The fine glass wool is chemically inert and is not affected by the material 13 so that it provides a permanent filtering medium. Owing to its great fineness and porosity, it permits a free circulation of the battery fluid while preventing the active material or paste from filtering through.

Modifications may be resorted to within the spirit and scope of my invention.

I claim:

A tubular diaphragm for storage batteries, comprising an inner tubular layer consisting of fine glass fibers, an overlying layer of comparatively coarse glass fibers, and a stiffening and strengthening material, comprising vulcanized rubber impregnating said outer layer.

GAMES SLAYTER.